United States Patent
Symoniak et al.

(10) Patent No.: US 11,574,367 B2
(45) Date of Patent: Feb. 7, 2023

(54) ESTIMATE POTENTIAL INSURANCE PAYOUT

(71) Applicant: Securian Financial Group, Inc., Saint Paul, MN (US)

(72) Inventors: Travis Joel Symoniak, Cottage Grove, MN (US); Donald Jerome Rosenthal, Saint Paul, MN (US)

(73) Assignee: Securian Financial Group, Inc., Saint Paul, MN (US)

( * ) Notice: Subject to any disclaimer, the term of this patent is extended or adjusted under 35 U.S.C. 154(b) by 188 days.

(21) Appl. No.: 16/723,946

(22) Filed: Dec. 20, 2019

(65) Prior Publication Data

US 2021/0192633 A1    Jun. 24, 2021

(51) Int. Cl.
G06Q 40/08 (2012.01)
G06F 3/0482 (2013.01)
G06Q 10/10 (2012.01)

(52) U.S. Cl.
CPC .......... *G06Q 40/08* (2013.01); *G06F 3/0482* (2013.01); *G06Q 10/1057* (2013.01)

(58) Field of Classification Search
CPC ........ G06Q 40/08; G06Q 40/04; G06Q 40/00; G06Q 40/06; G06Q 10/1057; G06F 3/0482
See application file for complete search history.

(56) References Cited

U.S. PATENT DOCUMENTS

| | | | |
|---|---|---|---|
| 5,523,942 A | 6/1996 | Tyler et al. | |
| 5,956,691 A | 9/1999 | Powers | |
| 6,012,043 A | 1/2000 | Mbright et al. | |
| 7,426,474 B2 | 9/2008 | Schoenbaum et al. | |
| 7,702,527 B1 | 4/2010 | Kron et al. | |
| 7,921,048 B2 | 4/2011 | Sloan et al. | |
| 7,966,200 B1 * | 6/2011 | Hopkins | G06Q 40/08 705/4 |
| 8,103,528 B2 | 1/2012 | Read et al. | |
| 8,306,832 B2 | 11/2012 | Shrivastava et al. | |
| 8,407,125 B2 | 3/2013 | Jenson et al. | |
| 8,433,589 B2 | 4/2013 | Fischer et al. | |

(Continued)

FOREIGN PATENT DOCUMENTS

CN    109598606 A  *  4/2019  .......... G06Q 40/025

OTHER PUBLICATIONS

David Bach, Finish Rich Quick Start System, 2012, FinishRich Media, LLC., web, 1-32 (Year: 2012).*

(Continued)

*Primary Examiner* — I Jung Liu (74) *Attorney, Agent, or Firm* — Merchant & Gould P.C.

(57) ABSTRACT

An example system for mapping payout information can include: a processor; and system memory including instruction which, when executed by the processor, cause the system to: generate a story selection module programmed to present a user with at least one story scenario, with the story scenario including a story having a story outline with a plurality of story conditions, and each of the story conditions includes a plurality of selectable story options; and generate an insurance payout module programmed to present the user with an estimated insurance payout based upon the selectable story options and information associated with an insurance plan available for selection by the user.

20 Claims, 8 Drawing Sheets

(56) References Cited

U.S. PATENT DOCUMENTS

| | | | |
|---|---|---|---|
| 8,537,986 B1 | 9/2013 | Cantu, II | |
| 8,543,425 B1 | 9/2013 | Hacker et al. | |
| 8,635,132 B1 | 1/2014 | Wilks et al. | |
| 8,892,467 B1* | 11/2014 | Ball | G06Q 40/00 |
| | | | 705/37 |
| 8,930,253 B1 | 1/2015 | Ball | |
| 10,102,588 B1 | 10/2018 | Gonsalves et al. | |
| 10,402,788 B2 | 9/2019 | Morrow et al. | |
| 11,049,184 B1* | 6/2021 | Hecht | G06Q 20/405 |
| 2002/0143680 A1 | 10/2002 | Walters et al. | |
| 2003/0187768 A1 | 10/2003 | Ryan et al. | |
| 2006/0089862 A1 | 4/2006 | Anandarao et al. | |
| 2010/0131300 A1 | 5/2010 | Collopy et al. | |
| 2010/0228651 A1 | 9/2010 | Becerra et al. | |
| 2014/0164287 A1 | 6/2014 | Hyde et al. | |
| 2014/0172465 A1 | 6/2014 | Yoder | |
| 2015/0220577 A1* | 8/2015 | Sengupta | G06F 16/22 |
| | | | 707/758 |
| 2019/0304024 A1* | 10/2019 | Colley | G06Q 30/0283 |

OTHER PUBLICATIONS

Benefitfocus Marketplace: Benefits Administrator Role, User Guide, https://www.blueshieldca.com/bsca/bsc/public/broker/PortalComponents/StreamDocumentServlet?fileName=Benefits_Administrator_Role_2018.1.pdf, 255 pages (2018).

* cited by examiner

ESTIMATE POTENTIAL INSURANCE PAYOUT

BACKGROUND

Insurance is a means of risk management that minimizes financial loss. Regardless of the type of insurance, insurance companies typically have a wide array of plans from which to choose. Insurance plans can vary based on various parameters, such as the benefit amount, covered events, etc. The number of available options often leads to confusion when selecting a desired plan. Due to this confusion, individuals may choose a plan without fully understanding the cost and coverage options.

SUMMARY

In one aspect, an example system for mapping payout information can include: a processor; and system memory including instruction which, when executed by the processor, cause the system to: generate a story selection module programmed to present a user with at least one story scenario, with the story scenario including a story having a story outline with a plurality of story conditions, and each of the story conditions includes a plurality of selectable story options; and generate an insurance payout module programmed to present the user with an estimated insurance payout based upon the selectable story options and information associated with an insurance plan available for selection by the user.

Other aspects are provided in the examples below.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the subject matter of this disclosure relates to the estimation of insurance payments. More specifically, systems and methods are provided for calculating potential insurance payout amounts based on customized story scenarios created for the user.

In some examples, an insurance payout mapping system disclosed herein presents the user with a generalized story outline. The story outline may include modifiable portions called story conditions. Each story condition has one or more story options from which the user can select to customize the story outline. Once all story conditions within the story outline are selected as desired by the user to match a specific scenario, the system can calculate the potential insurance payout amount for the selected scenario.

The insurance payout mapping system may use the user's enrollment type, geographic location, and insurance plan information and story information to calculate a potential insurance payout amount that is then presented to the user. This makes the scenario relevant for the user. The user may then modify story options for better understanding of his or her insurance needs.

The potential insurance payout amount is based on the specific insurance plans available to the user. Examples of such insurance plans include, without limitation, accident and hospital indemnity insurance. In one example, the user is an employee of a company that offers insurance plans as part of a benefit package for the user. The user initially makes an election of one or more of the insurance plans. Further, the user can usually change such an election, either at any point, at a specific life event, and/or at a particular time of year (e.g., at the beginning of each new calendar year).

In alternative embodiments, the insurance plans can be offered to other types of users. For instance, a financial institution can offer insurance plans to its customers. In another alternative, a membership organization such as the American Automobile Association can offer insurance plans to its members. Other configurations are possible.

The system can be beneficial to the user because the system helps the user make educated decisions when electing the insurance plans. Typically, insurance companies provide multiple plan options from which the user can choose. However, users are not always aware of the extent of coverage that each plan provides under particular situations. For example, users may not be aware of what is covered by insurance in a situation where the user breaks his/her arm in an accident and has to take an ambulance ride to the hospital.

Being aware of the extent of coverage may help users make more informed choices when selecting insurance plans. In addition, if a user is already enrolled in a plan, having an understanding of the extent of coverage of that plan may help users add additional coverage or even make lifestyle changes in order to avoid a condition/situation that would result in a large financial burden. For example, before going on a ski trip, a user may estimate insurance coverage in case of an accident and based on the estimated payout amount decide to add accident insurance and hospital indemnity insurance for extra coverage and payout. In another example, during a reenrollment period, a user may want to understand how hospital indemnity insurance might benefit the user's large family that includes several children, should one of the children be hospitalized.

Figure 1:
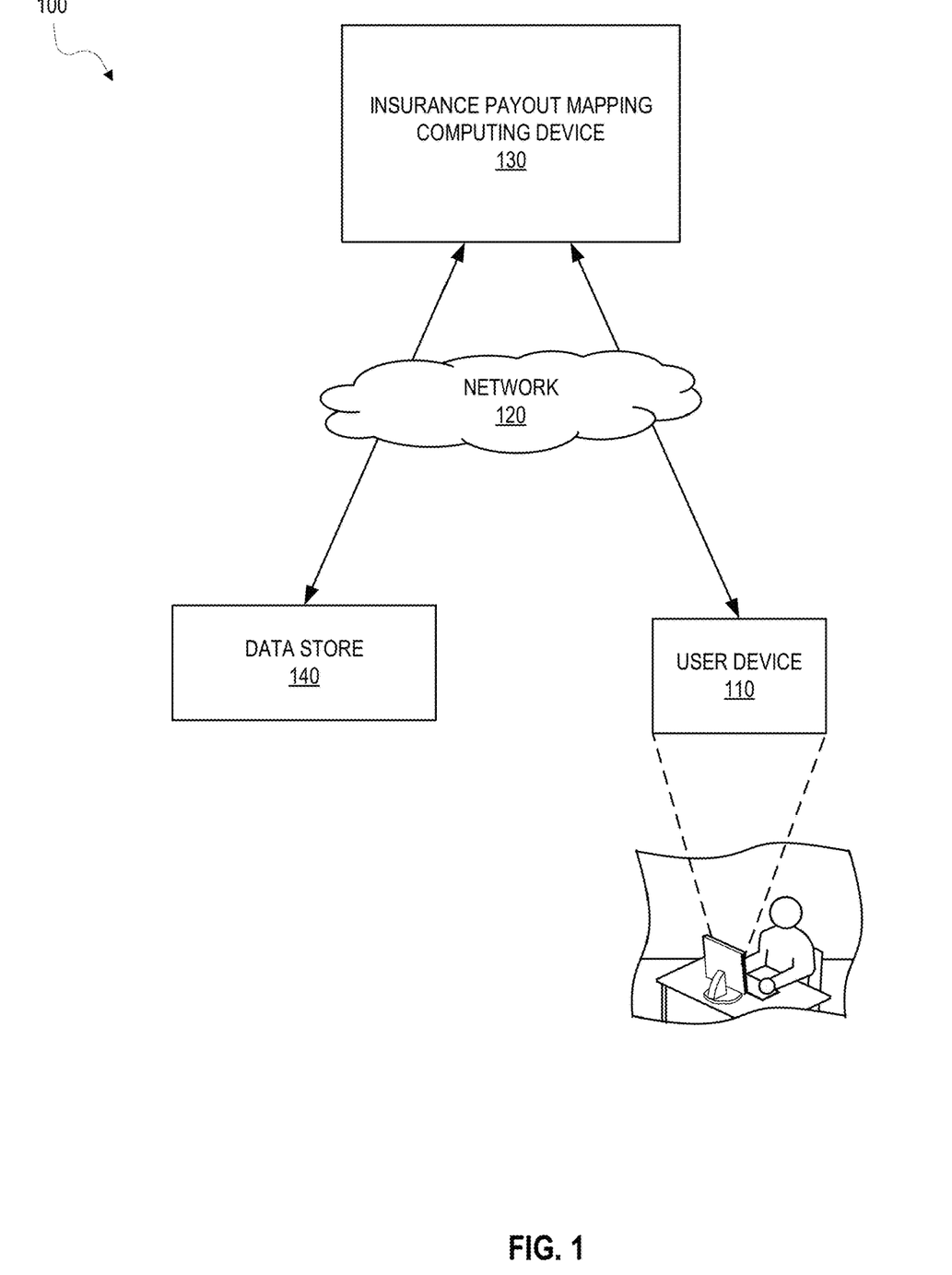
FIG. 1 illustrates an example insurance payout mapping system.

FIG. 1 illustrates an example insurance payout mapping system 100 that can support and incorporate data from one or more data stores. The system 100 includes client device 110, a network 120, an insurance payout mapping computing device 130, and a data store 140. More, fewer, or different components are possible. For instance, the system 100 can have many client devices and multiple computing devices that form the insurance payout mapping computing device 130.

The client device 110 is a computing device (e.g., laptop, desktop, tablet, mobile device, etc.) that displays one or more user interfaces generated by insurance payout mapping computing device 130 as the associated with data accessed from the data store 140. For instance, as described further below with reference to FIGS. 2-8, the client device 110 can display near real-time information associated with potential insurance payouts based on customized story scenarios.

The example network 120 is a computer network and can be any type of wireless network, wired network and cellular network, including the Internet. The client device 110 communicates with the insurance payout mapping computing device 130 through the network 120.

Generally, the insurance payout mapping computing device 130 accesses data from the data store 140 and processes the data before presenting the processed data on the client device 110 through one or more graphical user interfaces. The insurance payout mapping computing device 130 can be programmed to access data from the data store 140 to obtain necessary data, as detailed further below.

In some examples, the data store 140 may be a database. Other types of data stores are also possible. For instance, in some scenarios, the insurance payout mapping computing device 130 performs one or more queries (e.g. using Structured Query Language (SQL)) to access the data. Other configurations are also possible. The insurance payout mapping computing device 130 can include a plurality of computing devices, including a server farm or other cloud computing architectures.

Figure 2:
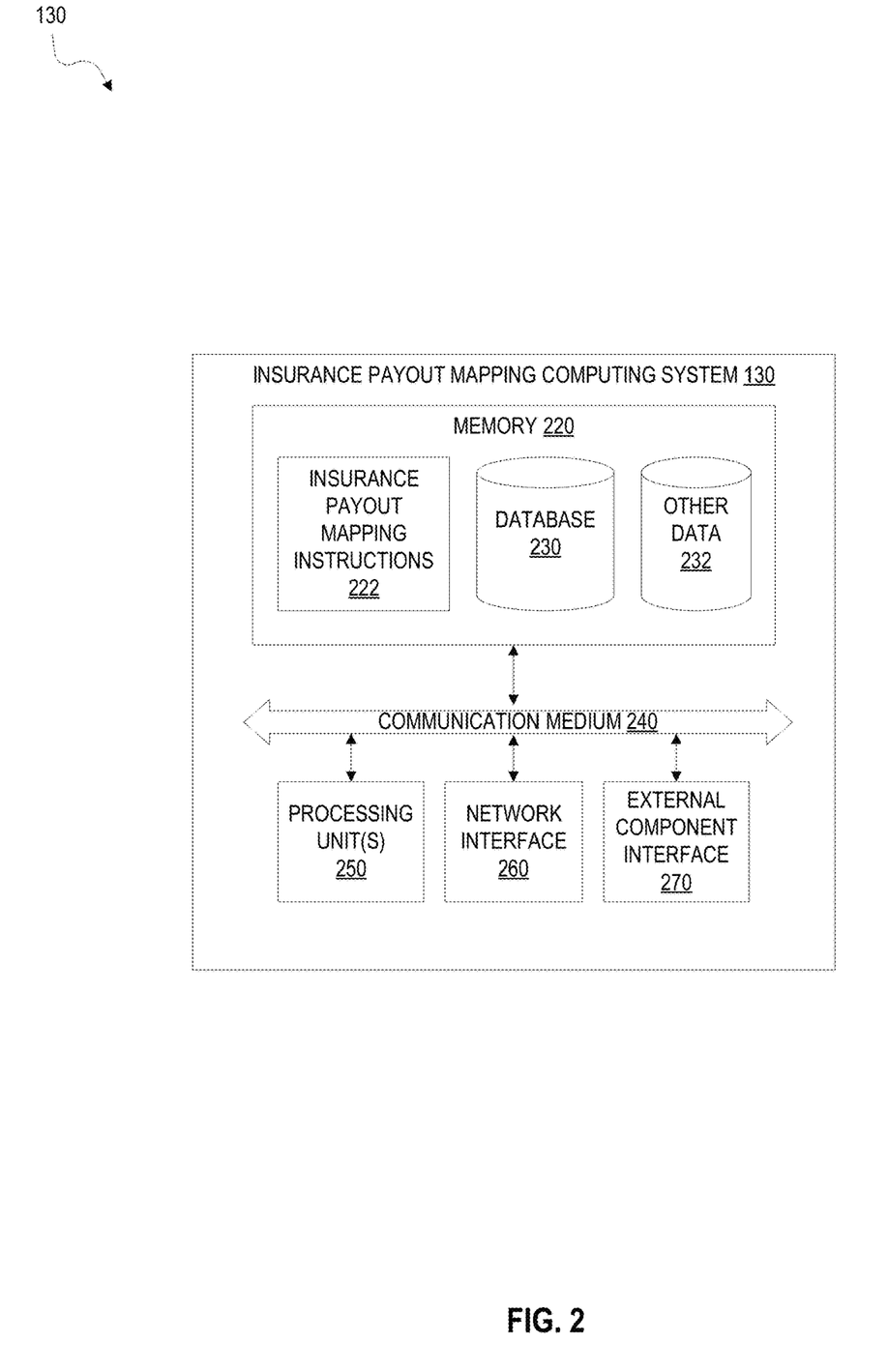
FIG. 2 illustrates example components of an insurance payout mapping computing device of the system of FIG. 1.

One example of the physical components that can make up the insurance payout mapping computing device 130 are shown in reference to FIG. 2. The same or similar components can be used to make up the client device 110.

In the example shown, the insurance payout mapping computing device 130 can include a physical computing environment, a virtualized computing environment, or a combination thereof, and useable any of the computing systems described in connection with FIG. 1. The computing environment 130 can include memory 220, a communication medium 240, one or more processing units 250, a network interface 260, and an external component interface 270.

The memory 220 can include a computer readable storage medium. The computer storage medium can be a device or article of manufacture that stores data and/or computer-executable instructions. The memory 220 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 220 can store various types of data and software. For example, as illustrated, the memory 220 includes instruction 222 for implementing one or more aspects of the insurance payout mapping computing device 130.

The communication medium 240 can facilitate communication among the components of the computing system 210. In an example, the communication medium 240 can facilitate communication among the memory 220, the one or more processing units 250, the network interface 260, and the external component interface 270. The communications medium 240 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 250 can include physical or virtual units that selectively execute software instructions. In an example, the one or more processing units 250 can be physical products comprising one or more integrated circuits. The one or more processing units 250 can be implemented as one or more processing cores. In another example, one or more processing units 250 are implemented as one or more separate microprocessors. In yet another example embodiment, the one or more processing units 250 can include an application-specific integrated circuit (ASIC) that provides specific functionality. In yet another example, the one or more processing units 250 provide specific functionality by using an ASIC and by executing computer-executable instructions.

The network interface 260 enables the computing system 210 to send and receive data from a communication network (e.g., network 16). The network interface 260 can be implemented as an Ethernet interface, a token-ring network interface, a fiber optic network interface, a wireless network interface (e.g., WI-FI), or another type of network interface.

The external component interface 270 enables the computing system 210 to communicate with external devices. For example, the external component interface 270 can be a USB interface, Thunderbolt interface, a Lightning interface, a serial port interface, a parallel port interface, a PS/2 interface, and/or another type of interface that enables the computing system 210 to communicate with external devices. In various embodiments, the external component interface 270 enables the computing system 210 to communicate with various external components, such as external storage devices, input devices, speakers, modems, media player docks, other computing devices, scanners, digital cameras, and fingerprint readers.

Although illustrated as being components of a device, the components of the insurance payout mapping computing device 130 can be spread across multiple computing devices. For example, one or more of instructions or data stored on the memory 220 may be stored partially or across a cloud computing system or otherwise distributed.

Figure 3:
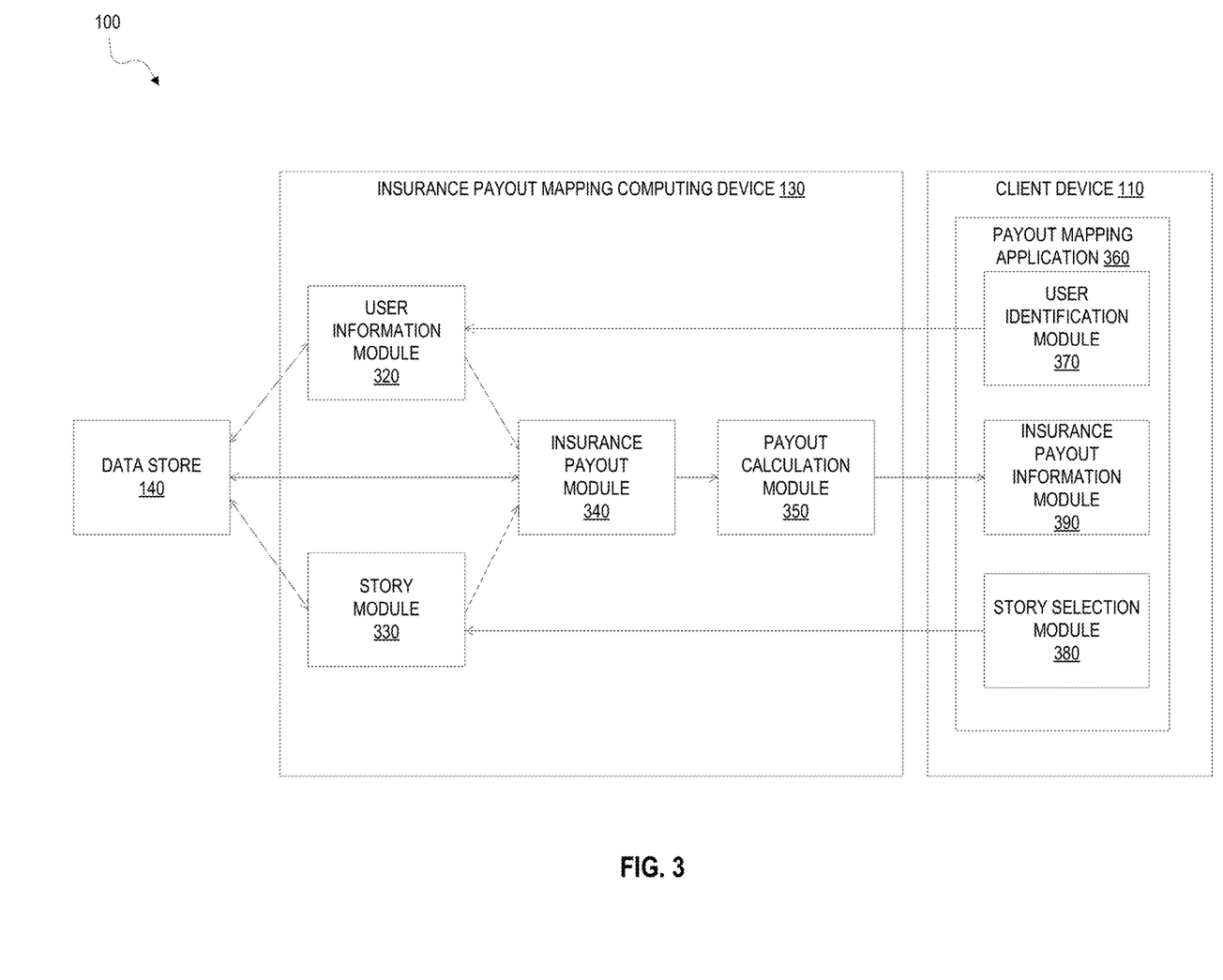
FIG. 3 illustrates additional logical components of the system of FIG. 1.

FIG. 3 illustrates additional details of the logical components of the insurance payout mapping system 100.

Generally, the client device 110 is programmed to display one or more graphical user interfaces to the user. The user interfaces include a story scenario with a story outline. The story outline includes story conditions. Each of the story conditions may include one or more story options from which the user to customize the user's story scenario. Example implementations of story scenarios are described in further detail in relation to the user interfaces shown in FIGS. 5-8.

The client device 110 can receive input from the user that is sent to the insurance payout mapping computing device 130 for further processing and can present output from the insurance payout mapping computing device 130 to the user. In this example, the client device 110 executes a payout mapping application 360 that, when accessed, generates a user identification module 370, a user story selection module 380, and an insurance payout information module 390.

Figure 5:
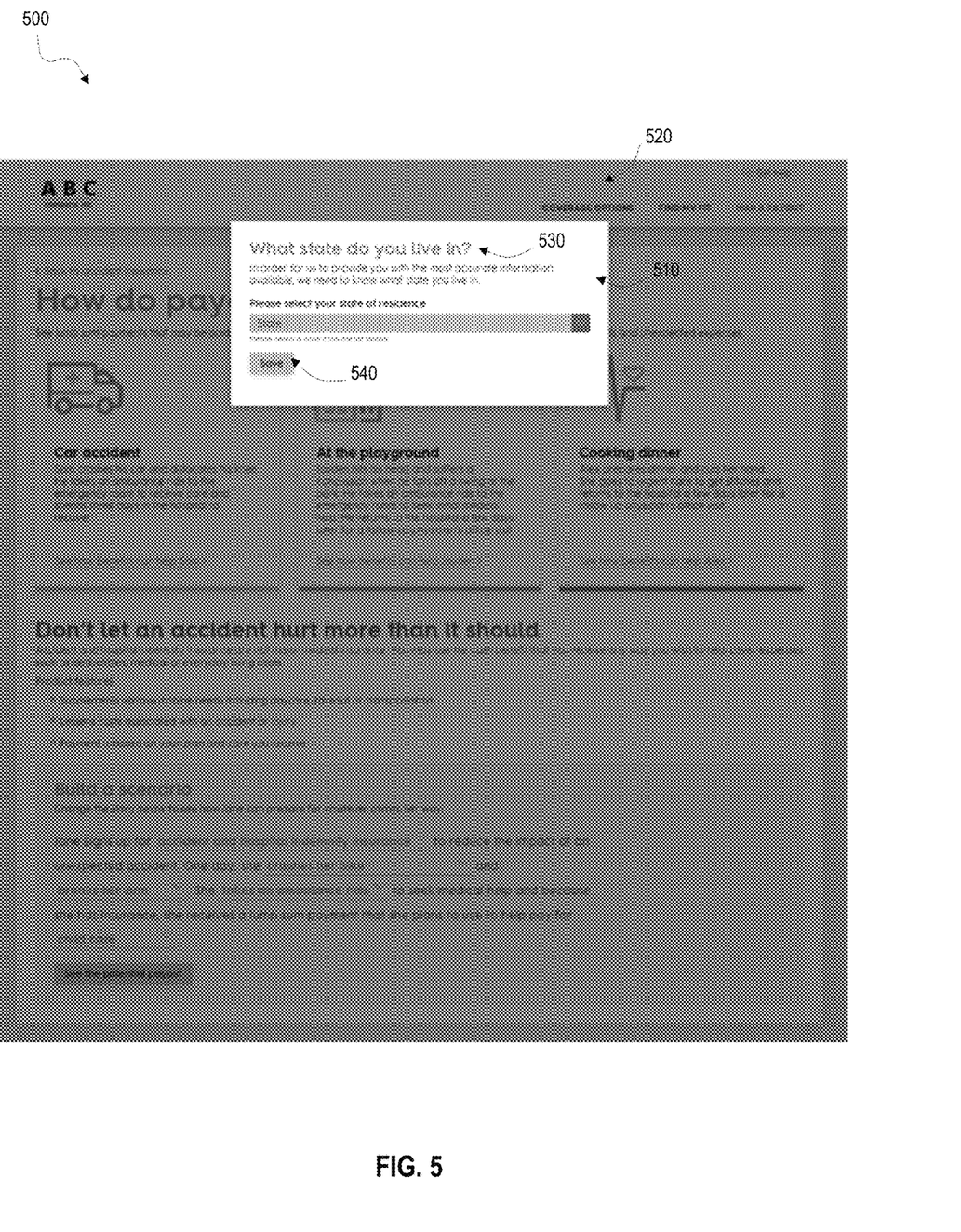
FIG. 5 illustrates an example user interface generated by the insurance payout mapping computing device of the system of FIG. 1.

More specifically, the user identification module 370 is programmed to receive information from the user that allows the system 100 to identify the user. As described further below, such information can be a location of the user or information that can more uniquely identify the user, such as a user name and/or password. The user identification module 370 can identify the user upon receiving the information and/or pass the information to the insurance payout mapping computing device 130 for identification. Upon identification, the insurance payout mapping computing device 130 can present the user with specific payout information that is tailored to the user. An example user interface generated by the user identification module 370 is shown in FIG. 5.

As noted, the identification of the user by the user identification module 370 can simply require enough information from the user to identify the insurance plans offered to the user. This can be as little as the user providing an employer name and/or account number associated with the insurance plans. It can be as much as specific authentication information that uniquely identifies the user and/or the user's benefits account that includes the relevant insurance plan offerings.

Figure 6:
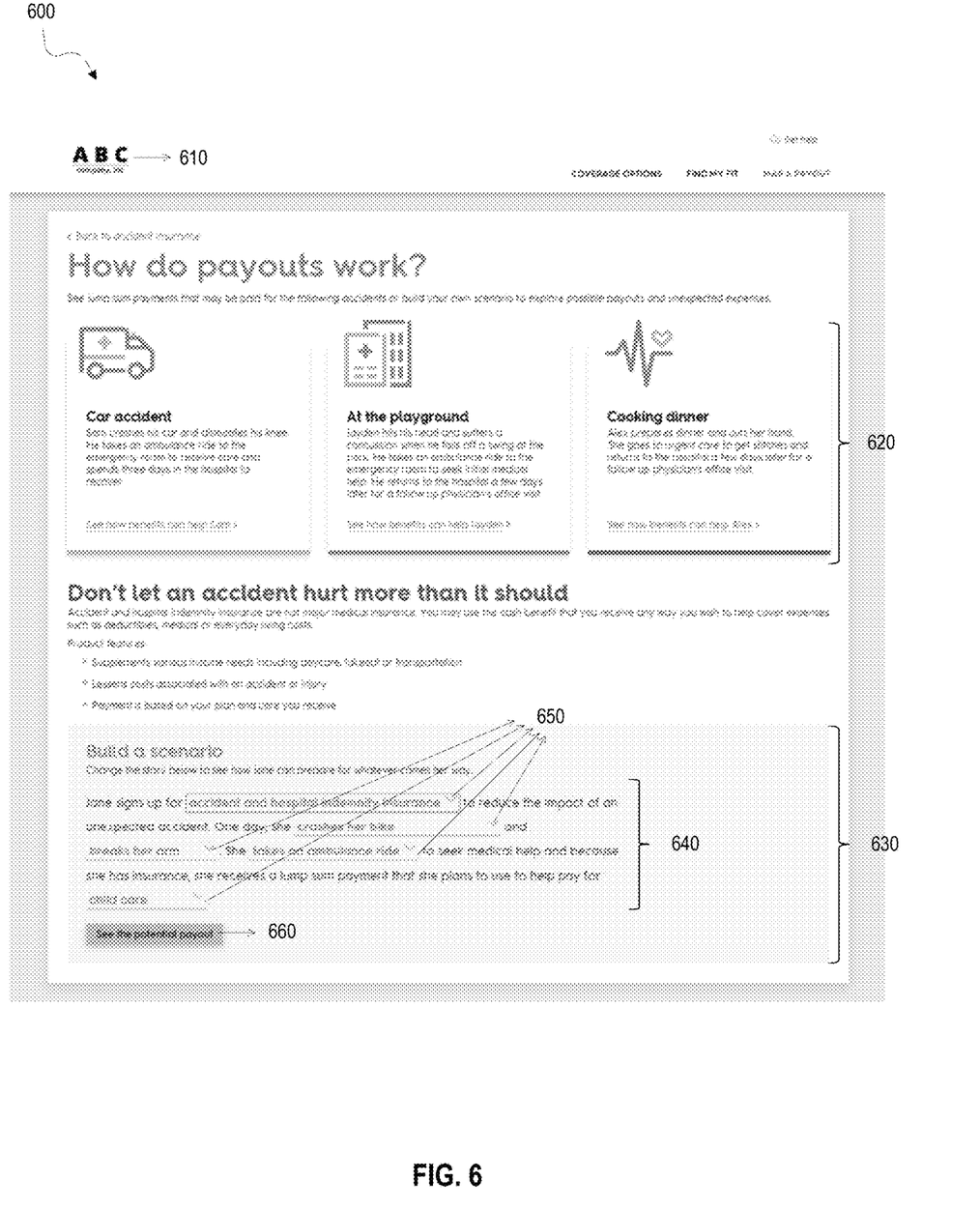
FIG. 6 illustrates another example user interface generated by the insurance payout mapping computing device of the system of FIG. 1.
Figure 7:
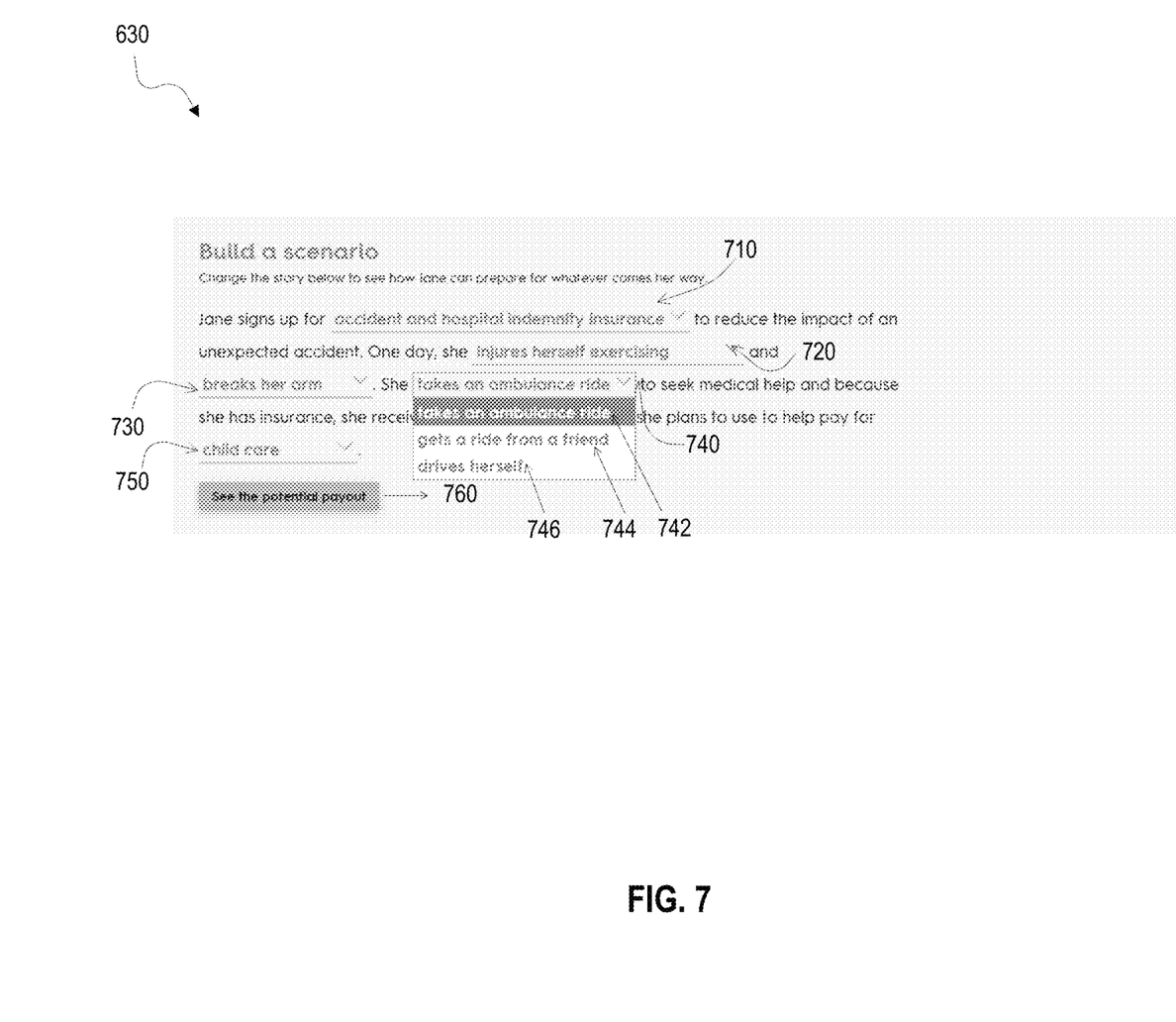
FIG. 7 illustrates another example user interface generated by the insurance payout mapping computing device of the system of FIG. 1.

The client device 110 also generates the user story selection module 380 that is programmed to present one or more story scenarios, each with a story outline having story conditions with story options selected by the user. Example user interfaces generated by the user story selection module 380 are shown in FIGS. 6-7.

Figure 8:
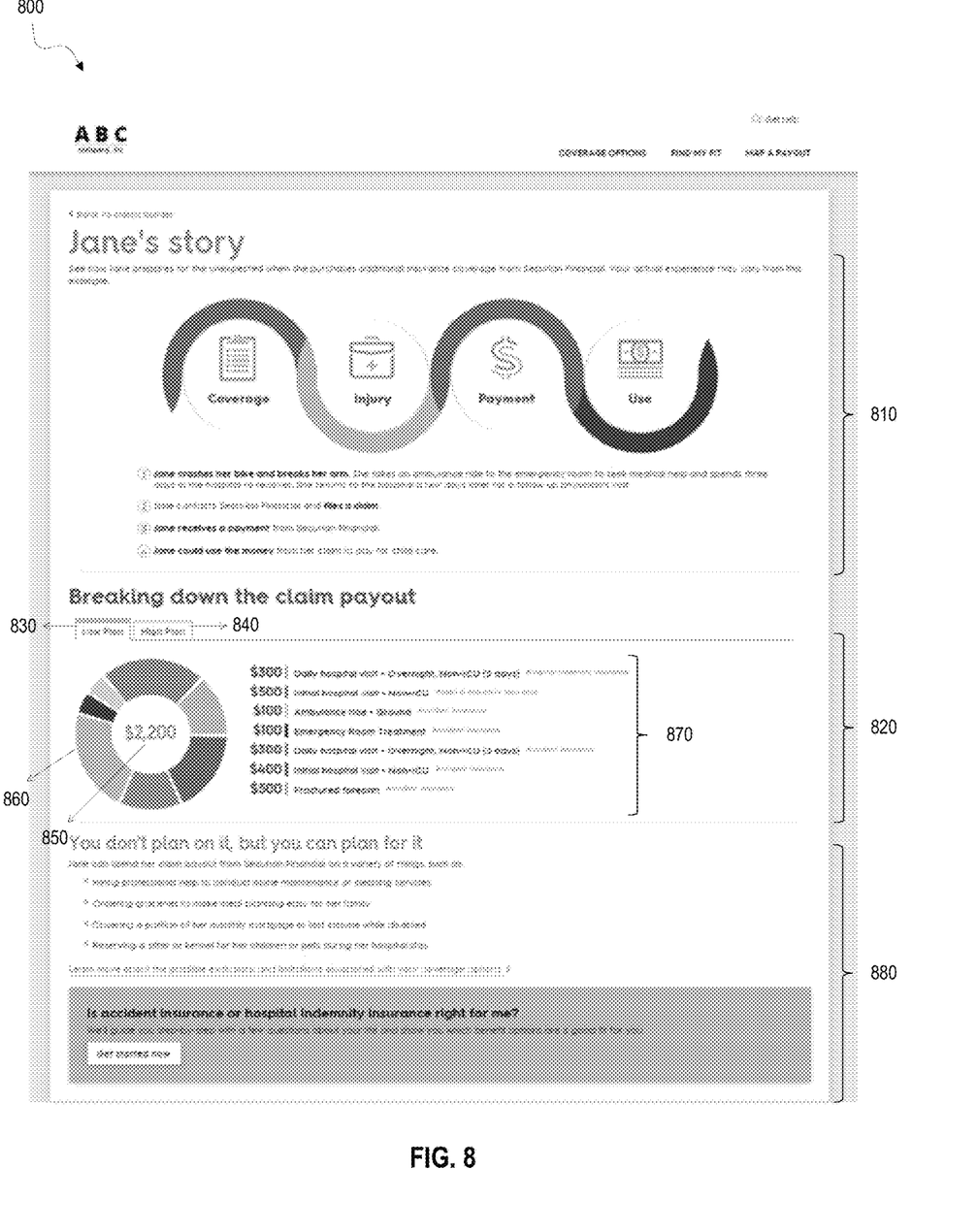
FIG. 8 illustrates another example user interface generated by the insurance payout mapping computing device of the system of FIG. 1.

In one example, the client device 110 also generates the insurance payout information module 390 that is programmed to present calculations of the potential insurance payout based upon the story scenario. The potential insurance payout amount may vary depending on a variety of factors including, but not limited to, the user's enrollment type and/or geographic location, the plans offered, the story options selected by the user when constructing the personalized story, and the insurance plan information. An example user interface generated by the insurance payout information module 390 is shown in FIG. 8.

In some examples, the insurance payout mapping computing device 130 receives the user identification information from the user identification module 370 and the user story selection information from the user story selection module 380, processes the information, and calculates the potential payout information before providing payout information to the insurance payout information module 390 for presentation to the user.

The insurance payout mapping computing device 130 includes various modules programmed to provide the story scenarios and calculate the potential insurance payouts associated therewith. In one example, the insurance payout mapping computing device 130 includes a user information module 320, a story module 330, an insurance payout module 340 and a payout calculation module 350. Although four sub-modules are illustrated as being included in the insurance payout mapping computing device 130, the insurance payout mapping computing device 130 can be implemented using more or less number of sub-modules, and each sub-module can be directed to implementing different aspects of the system 100 than shown in FIG. 3.

In one example, the user information module 320 can retrieve information associated with the user that is relevant to and/or impacts the insurance payout calculation in some manner. The relevant user information can be retrieved by the user information module 320 from the data store 140 based on user identification information that is submitted by the user through the user interface at the client device 110.

Some examples of relevant user information include: user's geographic location, user's age and user's insurance plan type. For example, insurance companies may be licensed to write insurance policies based on geographic region. Therefore, whether the user would receive an insurance payout may depend on the user location. The rate of coverage and payout amount may also vary depending on user location. A user's insurance plan type may also have an impact on the potential insurance payout amount. For example, whether a user receives an insurance payout for an ambulance ride following an accident may depend on whether the user's insurance plan includes accident insurance or hospital indemnity insurance coverage. The user information module 320 retrieves the relevant user information from a data store, such as data store 140 described in relation to FIG. 1. The retrieved information is then sent to the insurance payout module 340, described in detail below.

In one example, the user is employed by a company that already offers one or more existing insurance plans from an insurance company associated with the insurance payout mapping computing device 130. Upon identification by the user information module 320, the insurance payout mapping computing device 130 pulls information associated with the specific insurance plans offered to the company so that the user is provided with actual information associated with the insurance plans available to the user. This can assist the user in making difficult decisions regarding what coverage and options are appropriate for the user during enrollment in benefits with the company.

In one example, the story module 330 can retrieve at least one story scenario having one or more story options for each story condition available within the story outline of the story scenario. The story scenario is provided to the client device 110 for presentation to the user. The story module 330 can further receive the story options selected by the user for each story condition and send it to the insurance payout module 340, described below in detail. Further details and examples regarding story conditions and story options are described in relation to FIGS. 6-7.

In some examples, the insurance payout module 340 receives relevant user information retrieved by the user information module 320 and a list of all selected story options of the relevant story scenario from the story module 330 and uses the received information to retrieve the insurance payout rules associated with each of the received inputs from the data store 140. Once retrieved, the insurance payout rules are sent to the payout calculation module 350 for the rules to be logically resolved and the final insurance payout amounts to be calculated.

For example, one story option selected by the user may include "takes an ambulance ride." The insurance payout module 340 may access the data store 140 to retrieve the impact that the selected story option has on the potential insurance payout amount. In this case, the selection of "takes an ambulance ride" may result in an insurance payout rule of: "additional payout of $200 for ambulance rides."

In another example, the relevant user information received from the user information module 320 may include that the insurance plan type is "Plan A." In this case, the insurance impact of "Plan A" may include "does not cover ambulance rides." Both sets of information (e.g., "additional payout of $200 for ambulance rides" and "does not cover ambulance rides") may then be retrieved by the insurance payout module 340 from the data store 140 and sent to the payout calculation module 350 for logical resolution.

In one example, the payout calculation module 350 calculates the potential payout amount that is presented to the user based on the user's personalized story scenario. The insurance payout module 340 presents the payout calculation module 350 with all the relevant user information and story options selected by the user and the corresponding insurance impact of each of the factors. The payout calculation module 350 calculates the potential insurance payout amount based on the presented factors and generates the finalized insurance payout amount. This is provided to the insurance payout information module 390 for presentation to the user on the client device 110.

In the example presented above, both "additional payout of $200 for ambulance rides" and "does not cover ambulance rides" are resolved by the payout calculation module not providing any additional insurance payout for the ambulance ride.

Figure 4:
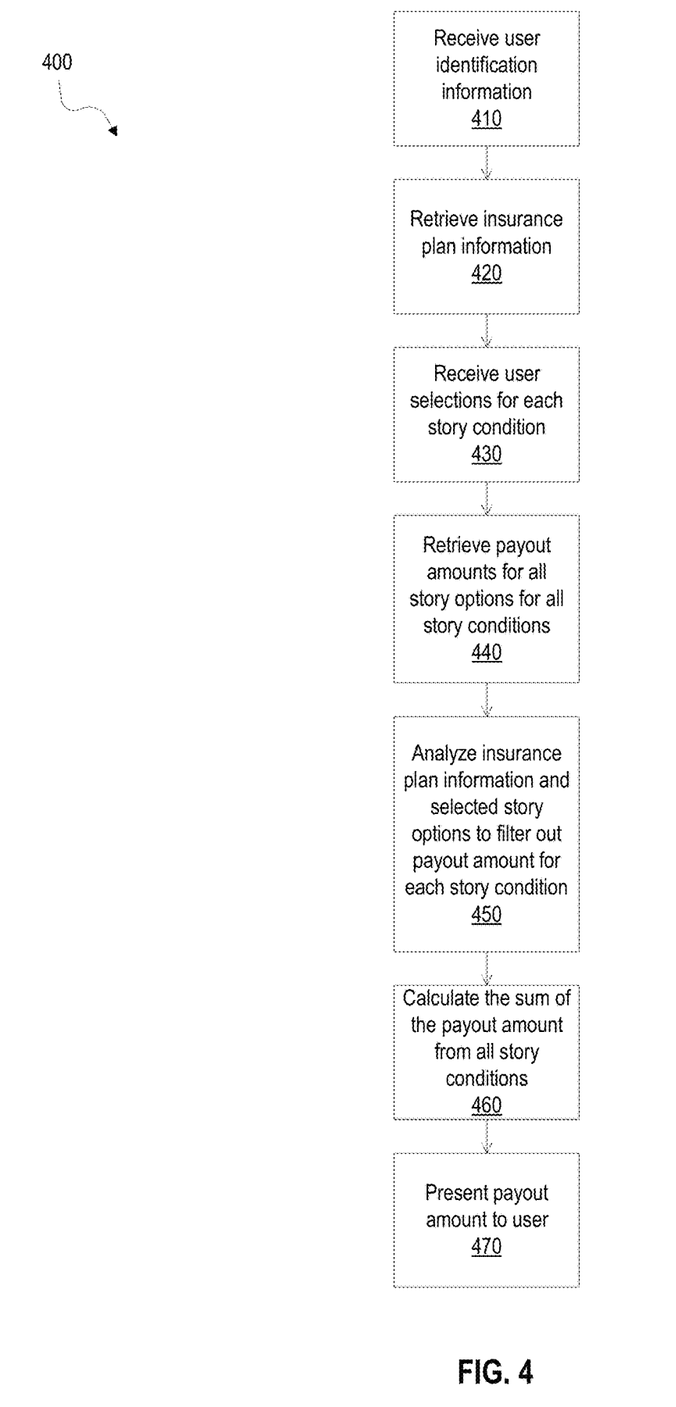
FIG. 4 illustrates an example method of mapping insurance payouts.

FIG. 4 illustrates a flowchart 400 showing an example set of steps executed by the insurance payout mapping system 100 in providing the user with the potential insurance payout amount information.

In an example, the insurance payout mapping system 100 initiates the process of calculating the potential insurance payout amount when the user opens the payout mapping application 360 on the client device 110. In example operation 410, the system 100 receives user identification information. The user identification information is used to identify the user in some manner. For instance, the user can simply access the system 100 using a unique link (e.g., uniform resource locator) that identifies the user by the insurance plan(s) that are applicable to the user. In other scenarios, the user can provide identification information, such as the user's location. This helps to identify relevant insurance plans when an entity with which the user is associated has multiple locations that may impact insurance availability. In yet other examples, the user can provide more traditional authentication information, such as a username and password that is specific to the user. In other examples, user identification information may include an account number, biometric information (e.g., a fingerprint scan, a retinal scan) or any other means of identifying the user.

In example operation 420, the system 100 retrieves the relevant insurance plan information for the user from the data store 140. The potential insurance payout amount calculated by the system 100 is affected by the insurance plans specific to the user, such as how a user's insurance plan affects what conditions are covered and in what amounts.

In example operation 430, the system 100 receives the user's selection for each story condition of a story scenario. After a user is identified during operation 410, the user is presented with at least one story scenario having a story outline on a user interface of the client device 110 that includes one or more customizable story conditions. The user is presented with one or more selectable story options for each story condition. By selecting story options for each of the story condition that fits closest to the user's scenario, the user is able to customize the story outline. In example operation 430, each of the story options corresponding to each of the story conditions selected by the user is received by the system 100.

In example operation 440, the system 100 retrieves the potential insurance payout amounts associated with all the story options for all story conditions presented in the story outline from the data store 140.

In example operation 450, the system 100 analyzes the received story options and the insurance plan information for the user to logically filter the potential payout amount associated with each story condition. For example, the user may select a story scenario in which the user gets into an accident and subsequently takes an ambulance ride to the hospital. During operation 440, the system 100 may determine that up to $200 of an ambulance ride is covered. However, during operation 450, the user's actual insurance plan information is factored into the payout calculation. Thus, if a user does not have an insurance plan that covers ambulance rides, the story condition "took an ambulance ride" may result in $0 of potential insurance payout amount.

In example operation 460, the system 100 sums up the potential payout amounts associated with each story condition, as calculated during operation 450. The summed up amount represents the potential total insurance payout amount associated with the selected story scenario for that particular user.

In example operation 470, the system 100 presents the calculated potential insurance payout amount from operation 460 to the user on the client device 110. The system 100 presents the potential payout amount through the user interface generated by the client device 110 associated with the system 100. Such user interfaces are further described in detail in relation to FIGS. 5-8.

Although FIG. 4 illustrates an example set of steps executed by the system 100 in calculating and presenting the insurance payout information to the user, operations 410-470 may not be executed in the same order that is presented in FIG. 4. One or more of the operations 410-470 may be executed in a different order or not executed at all. More or less number of operations than presented in FIG. 4 may be executed in calculating and presenting the insurance payout information to the user.

FIG. 5-8 illustrate various examples of the user interface associated with the insurance payout mapping system 100.

FIG. 5 illustrates an example user interface 500 presented to the user upon initially launching payout mapping application 360 associated with the insurance payout mapping system 100 on the client device 110.

Upon launching the payout mapping application 360 on the client device 110, the user may be presented with the initial user interface 500 requesting user information. In some examples, the requested user information may include user identification information that allows the system to determine which insurance plans are applicable. In other examples, such as the one presented in FIG. 5, the user may only need to provide user specific information as needed for the system to provide more accurate estimate of the insurance payout amount projections, such as the user's current location (e.g., state of residence).

Specifically, the user interface 500 presents an optional "pop-up" window 510 from the underlying system window 520 that includes one or more one or more questions for the user to fill out or select. The underlying system window 520 may be "greyed out," or does not receive any user input until the questions in the "pop-up" window 510 are answered by the user. In other instances, the identification information for the user, such as the location, can already be known, such as through the use of a unique link to access the system and/or through prior interactions with the user. In other examples, an employer may have only a single geographic location, so that location is not needed to determine the applicable insurance plans.

One example question may include: "What state do you live in?" 530. The user may then select an answer or type in an answer before clicking on a "save" button 540. The user may subsequently be presented with additional questions as needed by the payout mapping application 360 to provide accurate insurance payout projections.

FIG. 6 illustrates another example user interface 600 that is presented on the client device 110 after the user completes the identification process or otherwise provides user specific information with the initial user interface 500. In some examples, upon identification, the user's personal and account information is retrieved by the system 100, and user-specific information 610 is displayed on the user interface 600.

In some examples, the user-specific information 610 may include the user's employer information when insurance is provide through the employer. In the example shown, the user-specific information 610 identifies the employer ("ABC" company) through which the user obtains the insurance.

The user interface 600 may include a pre-determined story scenario section 620. The pre-determined story scenario section 620 includes one or more example story scenarios related to common ways in which insurance payouts are made. The user may select one of the pre-determined story scenarios by clicking on the pre-determined story scenario that interests the user. One example of a pre-determined story scenario involves a "Car Accident" that includes story conditions associated with an automobile accident. This story scenario includes the following: "Sam crashes his car and dislocates his knee. He takes an ambulance ride to the emergency room to receive care and spends three days in the hospital to recover." Other pre-determined story scenarios (e.g., "At the playground" associated with an accident at a playground and "Cooking dinner" associated with an accident while cooking dinner at home) are also possible.

In addition to the story scenarios provided in the pre-determined story scenario section 620, the user interface 600 also includes a "build a scenario" section 630. The section 630 of the user interface 600 presents the user with the option of customizing the selected story scenario.

In one example, upon receiving the selection of one of the pre-determined story scenarios in the section 620, the selected story scenario is provided in the section 630 for customization by the user.

More specifically, the "build a scenario" section 630 includes a story outline 640 that includes one or more story conditions 650 that are customizable. Story outline 640 is typically an outline of a story scenario that commonly occurs to the claimants of the insurance, such as the "Car Accident". Some portions of the story outline 640 are fixed or permanent and other portions may be selectable by the user based on their individual scenario.

An example story outline 640 may include the following scenario:

Jane signs up for ______ to reduce the impact of an unexpected accident. One day, she ______ and ______.
She ______ to seek medical help and because she has insurance, she receives a lump sum payment that she plans to use to help pay for ______.

The portions of the example story outline that are left blank or otherwise highlighted for the user are the customizable story conditions 650. The rest of the story outline is fixed and unalterable by the user. Each of the story conditions 650 within the story outline 640 can be completed by selecting from one or more story options that are presented to the user. In one example, the story options can be presented as a selectable drop down menu. Other presentation options are also possible. The story options are described in further detail in relation to FIG. 7.

After the user completes the story outline 640 by picking an option for each of the story conditions 650, the user may click on the "see the potential payout" button 660. In some examples, clicking on the "see the potential payout" button 660 results in the user interface 600 being updated to a new display that includes the calculated potential insurance payout amount. Further details related to the display of the calculated potential insurance payout amount is described in relation to FIG. 8.

FIG. 7 illustrates the "build a scenario" section 630 of the user interface 600 in more detail. In the example section 630, the story conditions 710, 720, 730, 740, 750 are all selectable drop-down menus that include one or more story options. In some examples, the story conditions represent various aspects that impact insurance coverage. Such conditions include the specific insurance held (710), how and/or where the injury occurred (720), what type of injury occurred (730), and what medical services are provided (740). Other story conditions can include for what the money from any insurance payout might be used (750).

For example, the story condition 740 illustrates the available story options 742, 744, 746 when the drop-down menu of the story condition 740 is expanded. The available story options for example story condition 740 include: "takes an ambulance ride" 742, "gets a ride from a friend" 744 and "drives herself" 746. Other story options are also possible for the story conditions 710-750.

For example, story condition 710 can include the story options "accident and hospital indemnity insurance," "accident insurance" and "hospital indemnity insurance," which are defined based upon the available insurance plans for the specific user. In this example, story condition 720 can include the story options "crashes her bike," "trips and falls," "injures herself playing baseball" and "injures herself exercising." In this example, story condition 730 can include the story options "breaks her arm," "needs stitches," "hits her head" and "dislocates her arm." In this example, the story condition 750 includes the story options "child care," "take-out," "in-home care," "grocery delivery" and "lost income." Other story outlines with other story conditions that include other story options are also possible.

As described, the story outline is populated by one or more story options to form a complete story. In some examples, the story options provided for each story condition can be fixed or can dynamically change based on previously populated story conditions within the story outline. For example, based on the first story condition being populated as "One day, she crashes her bike," the subsequent story options for the story condition associated with the consequences of the accident may only include options for what happens when a person crashes a bike. In this case, the subsequent story options may include "broke an arm," "twisted an ankle," etc. and does not include an option such as "had a $2^{nd}$ degree burn."

Each story condition is populated with one of the available story options. In some examples, each story option is directly associated with an insurance consequence. For example, the story option "takes an ambulance" can be associated with an insurance consequence of "add $200 to insurance payout." In other examples, each story option for each story condition is not directly tied to concrete insurance consequences, but a combination of options together may be tied to an insurance consequence. For example, the combination of story conditions "Jane signs up for accident insurance" and "Jane takes an ambulance ride" can result in an insurance consequence of "add $200 to insurance payout" whereas, the combination of story conditions "Jane signs up for hospital indemnity insurance" and "Jane takes an ambulance ride" can result in an insurance consequence of "add $0 to insurance payout."

The potential payout (see FIG. 8) is calculated once the desired story conditions are received and selection of a "see the potential payout" button 760 is received. To calculate the potential payout in this example, based on the user's story selections, the system fetches all the available claims payout data by insurance plan product type (e.g., accident, hospital indemnity, or both), the state of residence and enrollment type from the data store.

Specifically, the system is programmed to fetch covered benefits from the story scenario by one or more of coverage available, state of residence, effective date based on enrollment type, and product type. The system further filters down to only the covered benefits that address the specific story scenario. For example, if the insurance plan does not have hospital indemnity, the system will not provide covered benefits for that product.

Further, the system is programmed to fetch benefit amounts for the relevant story scenario based upon the user's insurance plan(s). The system then returns the formatted covered benefits and benefit amount data to be presented to the user. Specifically, after all that data has been received, the data is filter to only the covered benefits that apply to the user's selected story scenario and displayed (e.g., by pie chart). Further, the details from the selected story scenario are included to further enhance the user's understanding of the potential payout. For instance, the story at the top of the payout page is customized based on the user's selections, as depicted in FIG. 8.

Thus, each of the story conditions received from the user impacts the potential payout. By modifying those story conditions, the user can see how the user's insurance plan can impact the payouts. In these examples, the selected story conditions are mapped directly to the insurance plan or plans available to the user. In this way, the user is presented with actual payout information based upon those plans.

In some embodiments, the benefits for the user can be "stacked". For instance, if the user considers purchasing both accidental and hospital indemnity, the system estimates a potential payout involving two or more payout streams—a condition-based stream (e.g., the benefits tied to a broken arm) and an activity-based stream (admitted to the hospital for treatment).

FIG. 8 illustrates an example user interface 800 that presents the user with the calculated potential insurance payout amount based upon the conditions received from the user in the given story scenario. The payout is calculated based upon the user's actual insurance plan information.

The example user interface 800 includes a summary section 810 that presents the user with a summary of the user selected story scenario. The summary section 810 may also include a summary of the timeline going forward.

In this example, the summary section 810 provides a summary of the selected story scenario (with the selected story options). The summary section 810 also indicates that a claim is filed and paid. Finally, the summary section indicates how the paid insurance money could be used to benefit the user. Other examples are possible.

The example user interface 800 may also include a breakdown of claim payout section 820. In some example, the breakdown of claim payout section 820 may include one or more tabs 830, 840 that indicate the insurance plans available to the user. For instance, the user's employer ("ABC company") may offer both a "Low Plan" and a "High Plan" to the user as part of insurance enrollment. The user can select the desired tab 830, 840 to show how each plan would impact the insurance payout for the selected story scenario.

Examples of a low plan 830 may include a low monthly cost plan with lower benefit amounts. Examples of a high plan 840 may include a high monthly cost plan with higher benefit amounts. Other arrangements to represent different insurance plans is also possible.

The information presented for the selected plan in the breakdown of claim payout section 820 includes a total insurance payout amount 850 and a visual representation of the breakdown of the total insurance payout amount 860, which includes an explanation section 870 regarding what each value represents.

In the illustrated example, the total insurance payout amount 850 is listed as $2,200 under the low plan 830. The visual representation 860 is shown as a circle, wherein the circle is broken up into portions and color coded to represent how the total insurance payout amount 850 is broken down into categories. The presentation of the payout amount to the user can vary depending on the actual components of the payout and the payout amounts. Further, other ways to present the payout amount can also be used, such as bar graphs, etc.

In an example, the explanation section 870 can list each category of the visual representation 860 by color and includes a text explanation of the cost, category type and which type of insurance provided the money. For example, in the above presented example, the $2,200 is broken down into seven categories. $300 is allocated to "Daily hospital visit—Overnight, Non-ICU (3 days)" and came from hospital indemnity insurance, $500 is allocated to "Initial hospital visit—Non-ICU" and came from hospital indemnity insurance, $100 is allocated to "Ambulance ride—Ground" and came from accident insurance, $100 is allocated to Emergency Room Treatment and came from accident insurance, $300 is allocated to "Daily hospital—Overnight, Non-ICU (3 days)" and came from accident insurance, $400 is allocated to "Initial hospital visit—Non-ICU" and came from accident insurance and $500 is allocated to "Fractured forearm" and came from accident insurance.

In some examples, the total insurance payout amount 850 and the visual representation of the breakdown of total insurance payout amount 860 and the associated explanation section 870 may vary between the low plan 830 and the high plan 840. By viewing the potential payout information provided under different or alternate insurance plans may help users in identifying which plan would be right for them.

In some examples, the user interface 800 also includes an "add insurance coverage" section 880 that allows users to add additional insurance coverage. After reviewing the total insurance payout amount and the breakdown of how the payout amount is allocated, users may want to add additional coverage in case such a story scenario happens to them. The add insurance coverage section 880 provides a quick summary of available options and a step by step way to add the additional insurance coverage the user seeks.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A system for mapping payout information, the system comprising:
a processor; and
system memory including instruction which, when executed by the processor, cause the system to:
generate a story selection module programmed to present a user with at least one story scenario, with the story scenario including a story having a story outline with a plurality of story conditions embedded within the story outline and describing aspects of the story outline that happen to the user as part of an insurance payout, and each of the story conditions includes a plurality of selectable story options that is dynamically modified based on previously-selected story conditions;
upon receipt of selection of a first story condition of the plurality of story conditions that are presented within the story outline, generate a plurality of first selectable story options associated with the first story condition;
upon receipt of selection of one of the plurality of first selectable story options:
update the story scenario within the story outline to reflect the one of the first selectable story options; and
dynamically modify the plurality of selectable story options presented for user selection, the plurality of selectable story options associated with a remaining ones of the plurality of story conditions within the story outline, the dynamic modification being based upon the selection of the one of the plurality of first selectable story options; and
generate an insurance payout module programmed to present the user with an estimated insurance payout based upon the selectable story options and an insurance plan available for selection by the user.

2. The system of claim 1, wherein the system memory includes further instructions which, when executed by the processor, cause the system to generate an identification module programmed to received identification information from the user, wherein the identification information is used to identify the user.

3. The system of claim 2, wherein the system memory includes further instructions which, when executed by the processor, cause the system to select one or more specific insurance plans based upon the user's identity.

4. The system of claim 3, wherein the insurance plans are offered to the user as an employee of a company.

5. The system of claim 1, wherein the selectable story options are presented in a dropdown menu associated with each respective story condition.

6. The system of claim 1, wherein the story conditions are related to a type of insurance and a type of injury.

7. The system of claim 1, wherein the story conditions are related to a type of insurance, a type of injury, and a type of medical services provided.

8. The system of claim 7, wherein the story conditions are further related to for what proceeds from an insurance payout will be used.

9. The system of claim 1, wherein the insurance payout module is further programmed to include two or more interfaces, which each interface relating to a type of insurance coverage offered for the user.

10. A method for mapping an insurance payout, the method comprising:
presenting a user with at least one story scenario;
providing the story scenario with a story outline with a plurality of story conditions embedded within the story outline and with each of the story conditions describing aspects of the story outline that happen to the user as part of an insurance payout, and the story conditions including a plurality of selectable story options, with the plurality of selectable story options being dynamically modified based on previously-selected story conditions;
upon receiving a selection of one or more of the selectable story options that are presented within the story outline, generating a plurality of first selectable story options associated with the first story condition;
upon receiving selection of one of the plurality of first selectable story options:
updating the story scenario within the story outline to reflect the one of the first selectable story options; and
dynamically modifying the plurality of selectable story options presented for user selection, the plurality of selectable story options associated with a remaining ones of the plurality of story conditions within the story outline, the dynamic modification being based upon the selection of the one of the plurality of first selectable story options; and
generating an estimated insurance payout based upon the selectable story options and information associated with an insurance plan available for selection by the user.

11. The method of claim 10, further comprising receiving identification information from the user.

12. The method of claim 11, further comprising selecting one or more specific insurance plans based upon the user's identity.

13. The method of claim 12, wherein the insurance plans are offered to the user as an employee of a company.

14. The method of claim 10, further comprising presenting the selectable story options in a dropdown menu associated with each respective story condition.

15. The method of claim 10, wherein the story conditions are related to a type of insurance and a type of injury.

16. The method of claim 10, wherein the story conditions are related to a type of insurance, a type of injury, and a type of medical services provided.

17. The method of claim 10, further comprising presenting the user with two or more interfaces, which each interface relating to a type of insurance coverage offered for the user.

18. A non-transitory computer-readable medium encoding instructions for causing a computing device to:
present a user with at least one story scenario;
provide the story scenario with a story outline with a plurality of story conditions, with each of the story conditions describing aspects of the story outline that happen to the user as part of an insurance payout and the story conditions including a plurality of selectable story options, with the plurality of selectable story options being dynamically modified based on previously-selected story conditions;

receive a selection of one or more of the selectable story options that are presented within the story outline;

generate a plurality of first selectable story options associated with the first story condition;

upon receipt of selection of one of the plurality of first selectable story options:

update the story scenario within the story outline to reflect the one of the first selectable story options; and dynamically modify the plurality of selectable story options presented for user selection, the plurality of selectable story options associated with a remaining ones of the plurality of story conditions within the story outline, the dynamic modification based upon the selection of the one of the plurality of first selectable story options; and generate an estimated insurance payout based upon the selectable story options and information associated with an insurance plan available for selection by the user.

19. The non-transitory computer-readable medium of claim 18, further encoding instructions for causing the computing device to present the selectable story options in a dropdown menu associated with each respective story condition.

20. The non-transitory computer-readable medium of claim 18, wherein the story conditions are related to a type of insurance and a type of injury.

\* \* \* \* \*